Oct. 5, 1943.     J. E. FRANCES     2,331,020
PIPE JOINING MEANS
Filed Oct. 10, 1941
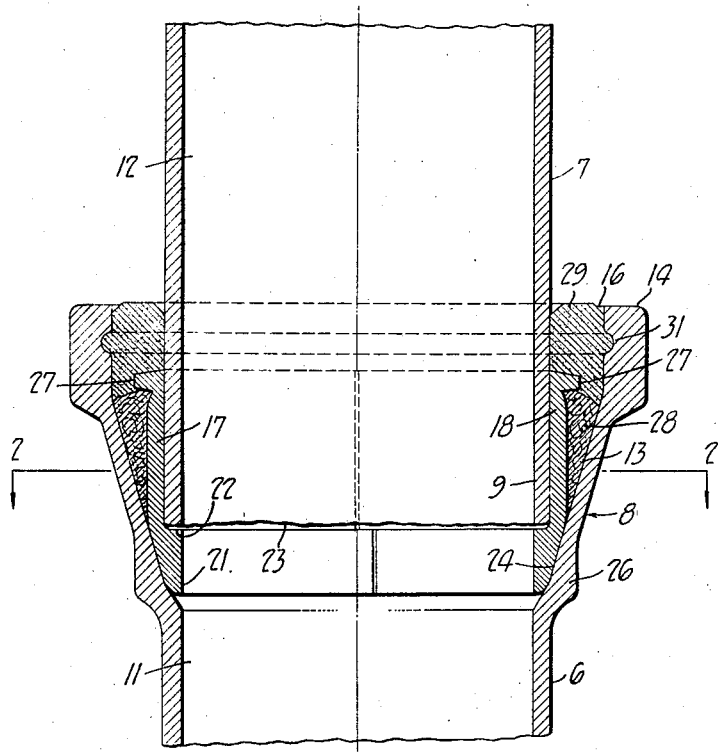
FIG_1_
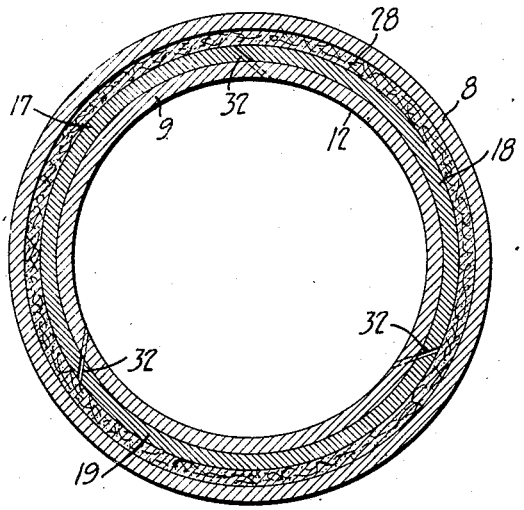
FIG_2_
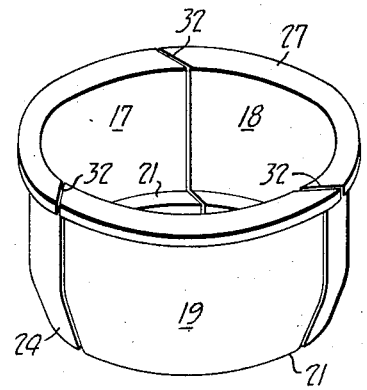
FIG_3_
INVENTOR
Joseph E. Frances
BY Joseph B. Gardner
his atty.

Patented Oct. 5, 1943

2,331,020

UNITED STATES PATENT OFFICE 2,331,020

PIPE JOINING MEANS

Joseph E. Frances, Oakland, Calif.

Application October 10, 1941, Serial No. 414,494

2 Claims. (Cl. 285—115)

The invention relates to pipe fittings and more particularly to means for securing the end of one pipe section in the bell hub of another pipe section.

In my copending application Serial No. 296,260, filed September 23, 1939, I have disclosed a construction whereby a plurality of sections of the character above may be attached and sealed together equally and readily with a substantial saving of time, labor and material, and be automatically self-aligned with proper registration of the internal passages of the pipe sections upon attachment. In the construction disclosed in my copending application, the end of the pipe section adapted for connection in the bell hub is preformed in a particular manner distinguishing it from ordinary pipe length ends. In pipe installations, it is usually necessary to cut one or more pipe sections to accommodate the pipe line to the length of the installation and plumbers in such cases usually cut a pipe section to length, leaving a plain ended pipe which is sealed in the bell hub of the adjacent pipe section. This latter joint has heretofore had to be packed with oakum or the like and caulked with lead in the usual manner and has been subject to the disadvantages and deficiencies overcome in the use of my previous invention referred to. In accordance with the present invention and as a principal object thereof I have provided a pipe fitting construction which may be used in sealing a plane pipe section end in a bell hub and obtain substantially all of the advantages of the preformed construction disclosed in my aforesaid application.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of a pipe joining means constructed in accordance with the present invention.

Figure 2 is a cross-sectional view of the assembly illustrated in Figure 1 and taken substantially on the plane of line 2—2 of Figure 1.

Figure 3 is a perspective view of a part of the assembly illustrated in Figure 1.

The pipe joint of the present invention and as depicted in the accompanying drawing, comprises a plurality of pipe sections 6 and 7 which are adapted for endwise alignment and attachment of the end portions 8 and 9 thereof, so as to place in registration and alignment the internal passages 11 and 12 of the sections. The end portion 8 of section 6 is here in the form of an enlarged bell hub which is adapted to telescopically receive the end portion 9 of section 7, the inner wall 13 of the bell hub being generally flared outwardly towards the end 14 of the bell hub to facilitate the insertion of the end portion 9 of section 7 and to leave a substantial space 16 between the pipe section 7 and internal wall of the bell hub for receipt of packing material.

Embracing the section end 9 is a cylindrical assembly made up of a plurality of cylindrical segmental sections 17, 18 and 19 which snugly fit about the section end 9 and provide an external diameter substantially less than the internal diameter of the bell hub whereby the majority of the space 16 aforesaid is left for packing material. Each of the sections 17—19 is provided adjacent its inserted end 21 with an internally projecting shoulder 22 which is adapted to engage and support the end face 23 of the section end 9. Preferably these shoulders extend for the full circumferential dimension of the section and cooperate to provide a full annular internal shoulder for supporting the pipe end. In addition each of the sections adjacent its inserted end 21 is provided on the exterior surface thereof with a beveled portion 24 which conforms in general to the taper or flare of the bell hub so as to provide a close fitting wedged engagement with the internal wall 13 of the bell hub adjacent the base end 26 of the latter, thereby serving to center the cylindrical assembly in the bell hub and to provide an efficient seal therefor. As will be understood upon insertion of the pipe section with the sections in place, the engagement of the inner ends of the sections with the tapered wall of the bell hub, causes an inward movement of the sections against the pipe section, thereby providing a tight fit therebetween and also by reason of the limited length of engagement between the sections and the bell hub, a limited amount of tilting or canting of the inserted pipe section is permitted.

Provided adjacent the outer ends of the sections are outstanding projections or shoulders 27 which extend radially outwardly into the space 16 substantially midway thereof and function as an upper partition wall for oakum 28 or the like wound around the sections 17—19 and compressed in the tapered space below the shoulders or projections 27. As will be seen from Figure 1, the over-all length of the sections 17—19 is substantially less than the depth of the bell hub whereby the sections lie completely within the longitudinal dimension of the bell hub leaving space above the shoulders or projections 27 for sealing and caulking with lead 29. The latter is preferably poured into the space 16 above the projections 28 so as to completely fill the remaining part of the space and to pass by the projections 27 and into the oakum receiving space below the projections. When this lead is peened or caulked the same drifts or flows into a tightly sealed engagement around the pipe section 7 and around the projections 27. Preferably, a lead retaining recess 31 is provided in the interior wall of the bell hub adjacent the outer end 14 thereof so as to key and anchor the lead in place.

In assembling the joint, I prefer to first set the sections 17—19 into a cylindrical form, as illustrated in Figure 3, and hold the latter in such form by means of a spring or piece of tape or the like placed around the circumference of the sections. To assist in holding these sections in proper relation to each other for insertion into the bell hub, and also to provide a better wedge fit between the sections, I form the abutting longitudinal edges 32 of the sections along non-radial planes so as to obtain a wedge fit of the sections against each other. After the sections have been placed in their cylindrical arrangement, the pipe section end 9 may be pressed into the interior of the sections until the end face 23 of the pipe is brought into engagement with the internal shoulders 22 of the sections. The oakum may then be wrapped around the sections 17—19 below the shoulders 27 and the assembly pressed into the end of the bell hub. This latter operation usually produces a compression of the oakum by reason of the tapered construction of the chamber in which the oakum is held and draws the oakum against the under side of the shoulders 27. The subsequent pouring and caulking of the lead further assists in binding the several members and parts together as above explained.

Desirably a construction is used wherein the internal passages 11 and 12 of the pipe sections to be secured are of the same diameter and in conformity therewith the internal shoulder 22 provided at the inserted end of the cylindrical assembly as a substantial equal internal diameter, thus providing a substantially smooth and uninterrupted passage flow from one of the sections to the other and pass the inserted end 21 of the sections.

I claim:

1. A means for connecting a pipe end in a pipe bell hub having a tapered internal wall of substantially larger diameter than said pipe end, comprising, a plurality of substantially inflexible segmental cylindrical sections each of less than 180° in circumference and fitting together to provide a cylindrical assembly having an internal diameter snugly embracing said pipe end and an external diameter insertible into said bell hub, the inserted ends of said sections being beveled on the exterior surface thereof to seat against said tapered internal bell hub wall to urge said sections into a tight fitting engagement with said pipe end and to center said sections and pipe end in said bell hub, said sections being formed with outstanding projections spaced from said inserted end thereof and adapted to support oakum or the like and sealing lead or the like on the opposite sides thereof in said bell hub.

2. A means for connecting a pipe end in a pipe bell hub having a tapered internal wall of substantially larger diameter than said pipe end, comprising, a plurality of substantially inflexible segmental cylindrical sections each less than 180° in circumference and fitting together to provide a cylindrical assembly having an internal diameter snugly embracing said pipe end and an external diameter insertible into said bell hub, said sections being formed adjacent their inserted ends with internal projections adapted for insertion between the end face of said pipe end and the base portion of said hub, the inserted ends of said sections being beveled downwardly and inwardly on the exterior surface thereof opposite the projections so as to seat against said tapered internal bell hub wall to urge said sections into a tight fitting engagement with said pipe end and to center said sections and pipe end in said bell hub, said sections being formed with outstanding projections spaced from said inserted end thereof and adapted to support oakum or the like and sealing lead or the like on the opposite sides thereof in said bell hub, the portion of said sections between said beveled surface and outwardly extending projections being cylindrical and arranged to define with the walls of said hub a downwardly projecting space for the reception of said oakum or the like and whereby when said space is filled with oakum or the like the latter will wedge and assist in forcing the sections against the pipe and seal the joints between the sections.

JOSEPH E. FRANCES.